(No Model.)
W. C. NYE.
POT COVER.
No. 342,706. Patented May 25, 1886.
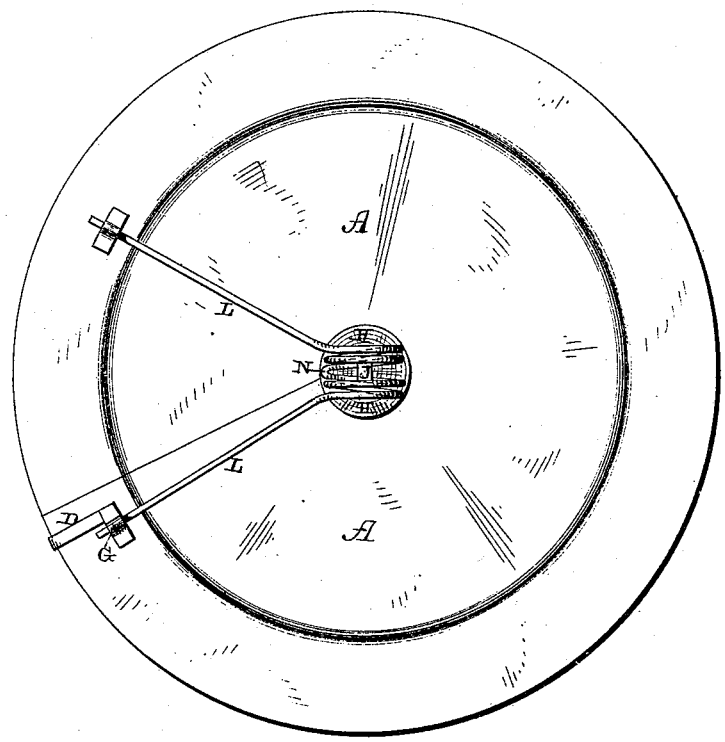
Fig. 1.
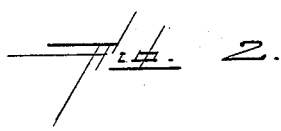
Fig. 2.
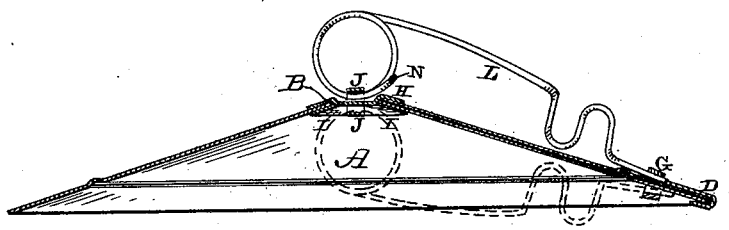
Witnesses.
L. F. Gardner
J. C. McDorman
Inventor —
W. C. Nye,
per J. A. Lehmann,
Atty.

UNITED STATES PATENT OFFICE.

WILLIAM C. NYE, OF BRADFORD, PENNSYLVANIA.

POT-COVER.

SPECIFICATION forming part of Letters Patent No. 342,706, dated May 25, 1886.

Application filed November 23, 1885. Serial No. 183,774. (No model.)

*To all whom it may concern:*

Be it known that I, WILLIAM C. NYE, of Bradford, in the county of McKean and State of Pennsylvania, have invented certain new and useful Improvements in Pot-Covers; and I do hereby declare the following to be a full, clear, and exact description of the invention, such as will enable others skilled in the art to which it pertains to make and use it, reference being had to the accompanying drawings, which form part of this specification.

My invention relates to an improvement in pot-covers; and it consists in, first, a circular elastic cover, made from a single piece of material, and which has a suitable opening through its top, with caps or washers which are applied to opposite sides of this opening, and a loop or other device which passes through the caps or washers for the purpose of securing them in position upon the cover; second, the combination of an elastic cover made from a single piece of any suitable material, with a spring-handle, which is applied to the cover for the purpose of contracting it to suit the different-sized cooking-utensils, as will be more fully described hereinafter.

The object of my invention is to attach to an expansible cover for cooking-utensils a removable handle for the purpose of lifting and contracting the cover, and which handle can be removed from the cover at any time that may be desired.

Figure 1 is a plan view of a cover embodying my invention. Fig. 2 is a vertical section of the same.

A represents the cover, which is circular in shape, and which has a suitable opening, B, made through its center. The two ends of the cover, which project from the center outward upon one side only, overlap each other to any desired extent, and are prevented from separating by means of the catch or guide D. This guide or catch D is formed from a single piece of material, and which has its outer end to project beyond the two overlapping edges, where it is turned backward upon itself, as shown. The inner end has its two corners passed down through slots in the top of the cover, so as to secure this end in position, and at the center of this inner end is formed the semicircle G, through which one end of the wire handle is passed.

Applied to opposite sides of the center of the cover are the two caps or washers, H I, which are secured in position by means of the looped holding device J. One or both ends of this device J may form a loop to receive the central portion or bend of the spring-handle, as shown. The spring-handle L is formed from a single piece of wire, which is provided with one or more coils at its center, and in between the two coils is formed the double-U-shaped projection N, which passes through the loop of the holding device. The two coils upon each side of this projection serve to throw the ends of the handle apart, and thus assist in expanding the cover so as to make it spring out against the inner side of the cooking utensil to which it is applied, and thus form a tight joint. The cover being made of elastic material will naturally spring outward so as to form sufficient frictional contact with the inner side of the cooking-utensil to hold the cover in any desired position in which it may have been adjusted; but the elasticity of the handle assists in expanding the cover and making it sure in its action. The outer ends of the handle are bent, as shown, so that the ends can be pushed back or forced inward so that they will snap through the holding-loops G, which are secured to the cover to receive them.

In order to attach the handle to the cover the ends of the handle are forced slightly apart, and then the central projection is made to catch in the loop formed upon the top of the holding device J. The ends of the handle are then forced backward until they are just opposite the inner edges of the holding-loops G, through which they snap as soon as they are released.

If so desired, the handle may be removed from the cover and applied to its under side when it is desired to convert the cover into a steamer or strainer.

The great advantage in making the handle removable, as here shown, consists in allowing the covers to be shipped while perfectly flat, as they occupy a great deal less room than they would if the handles were applied to them before transportation. The handles are packed by themselves, and the covers by themselves, and then the handles are applied to the covers after they have reached their destination.

Having thus described my invention, I claim—

1. The combination of a convex expansible cover, having overlapping ends, and provided with an opening through its center, the washers which are applied to opposite sides of the cover, and the elastic pronged handle L, which is fastened at its inner end to one of the washers, and which has its prongs attached to each one of the ends of the cover, substantially as shown.

2. The combination of the cover A, having overlapping ends, so as to be expansible, with the pronged-wire handle made from a single piece of spring-wire, and which is detachably connected to the cover at its center, and provided with the two arms, one of which is connected to each one of the overlapping ends near the outer edges of the cover, substantially as shown.

3. The combination of the cover provided with suitable holding devices for the handle, with the handle provided with the projection N, and the two elastic prongs or ends, which are connected to the cover near its outer edge, substantially as set forth.

4. An expansible cover, and the washers applied to opposite sides, in combination with a looped holding device, the spring-handle provided with a projection at its center to pass through the loop, and the loops applied to the cover to receive the ends of the handle, substantially as specified.

In testimony whereof I affix my signature in presence of two witnesses.

WILLIAM C. NYE.

Witnesses:
DAVID J. NYE,
J. H. BOYNTON.